US012325439B2

(12) United States Patent
Yazaki et al.

(10) Patent No.: US 12,325,439 B2
(45) Date of Patent: Jun. 10, 2025

(54) VEHICLE-MOUNTED APPARATUS, PROCESSING METHOD, AND NON-TRANSITORY STORAGE MEDIUM

(71) Applicant: NEC Corporation, Tokyo (JP)

(72) Inventors: Yuma Yazaki, Tokyo (JP); Takahiro Kato, Tokyo (JP); Yusuke Koitabashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 42 days.

(21) Appl. No.: 18/273,705

(22) PCT Filed: Jan. 27, 2021

(86) PCT No.: PCT/JP2021/002770
§ 371 (c)(1),
(2) Date: Jul. 21, 2023

(87) PCT Pub. No.: WO2022/162770
PCT Pub. Date: Aug. 4, 2022

(65) Prior Publication Data
US 2024/0101135 A1 Mar. 28, 2024

(51) Int. Cl.
*B60W 50/14* (2020.01)
*G06V 20/58* (2022.01)
*G06V 20/59* (2022.01)

(52) U.S. Cl.
CPC ............ *B60W 50/14* (2013.01); *G06V 20/58* (2022.01); *G06V 20/59* (2022.01);
(Continued)

(58) Field of Classification Search
CPC .......... B60W 50/14; B60W 2050/146; B60W 2554/4041; B60W 2556/65; B60W 2756/10; G06V 20/58; G06V 20/59
See application file for complete search history.

(56) References Cited

U.S. PATENT DOCUMENTS 9,953,228 B2 * 4/2018 Sano ................. G06T 11/60
10,882,536 B2 * 1/2021 Lee .................. B60W 50/14
(Continued)

FOREIGN PATENT DOCUMENTS

JP 2014-002647 A 1/2014
JP 2016-130959 A 7/2016
(Continued)

OTHER PUBLICATIONS

JP Office Action for JP Application No. 2022-577864, mailed on Jul. 9, 2024 with English Translation.
(Continued)

*Primary Examiner* — Mohamed Barakat

(57) ABSTRACT

A vehicle-mounted apparatus (10) according to the present invention includes: a surrounding object information acquisition unit (11) that acquires surrounding object information relating to a surrounding object being an object detected in surroundings of a vehicle; a line-of-sight information acquisition unit (12) that acquires line-of-sight information of a driver of the vehicle; an operation information acquisition unit (13) that acquires operation information indicating an operation performed by the driver on the vehicle; an operation intention information generation unit (14) that generates operation intention information associating an operation indicated by the operation information with the surrounding object causing the operation indicated by the operation information, based on the surrounding object information, the line-of-sight information, and the operation information; and a transmission and reception unit (15) that transmits the operation intention information to a surrounding vehicle.

10 Claims, 7 Drawing Sheets

(52) U.S. Cl.
CPC .......... *B60W 2050/146* (2013.01); *B60W 2554/4041* (2020.02); *B60W 2556/65* (2020.02); *B60W 2756/10* (2020.02)

(56) References Cited

U.S. PATENT DOCUMENTS

| | | | | |
|---|---|---|---|---|
| 2016/0004321 | A1* | 1/2016 | Takada | B60K 35/10 |
| | | | | 345/156 |
| 2016/0229395 | A1 | 8/2016 | Schmüdderich | |
| 2018/0225963 | A1 | 8/2018 | Kobayashi et al. | |
| 2018/0362053 | A1 | 12/2018 | Isa et al. | |
| 2020/0410264 | A1* | 12/2020 | Ahn | B60K 35/265 |
| 2021/0339770 | A1* | 11/2021 | Tamori | B60W 30/143 |
| 2021/0380137 | A1* | 12/2021 | Domeyer | G06V 20/56 |
| 2022/0212685 | A1* | 7/2022 | Oba | B60W 50/0098 |

FOREIGN PATENT DOCUMENTS

| | | | |
|---|---|---|---|
| JP | 2019-514104 A | | 5/2019 |
| JP | 2020106946 A | * | 7/2020 |
| JP | 2020123075 A | * | 8/2020 |
| WO | 2017/047176 A1 | | 3/2017 |
| WO | 2018/128946 A1 | | 7/2018 |

OTHER PUBLICATIONS

International Search Report for PCT Application No. PCT/JP2021/002770, mailed on Apr. 6, 2021.
Extended European Search Report for EP Application No. EP21922794.9 dated on Dec. 6, 2023.

* cited by examiner

FIG. 3

SURROUNDING OBJECT INFORMATION

| DATE AND TIME | OBJECT TYPE 1 | POSITION INFORMATION | OBJECT TYPE 2 | POSITION INFORMATION | ... |
|---|---|---|---|---|---|
| 20201221 14:00 | PERSON 1 | (x1, y1, z1) | PERSON 2 | (x2, y2, z2) | ... |
| .... | .... | .... | .... | .... | .... |

FIG. 4

LINE-OF-SIGHT INFORMATION

| DATE AND TIME | LINE-OF-SIGHT VECTOR | . . . . |
|---|---|---|
| 20201221 14:00 | (Vx1,Vy1,Vz1) | . . . . |
| ⋮ | ⋮ | ⋮ |

FIG. 5

OPERATION INFORMATION

| DATE AND TIME | OPERATION | · · · · |
|---|---|---|
| 20201221 14:00 | BRAKE OPERATION | · · · · |
| ⋮ | ⋮ | ⋮ | ously
VEHICLE-MOUNTED APPARATUS, PROCESSING METHOD, AND NON-TRANSITORY STORAGE MEDIUM This application is a National Stage Entry of PCT/JP2021/002770 filed on Jan. 27, 2021, the contents of all of which are incorporated herein by reference, in their entirety.

TECHNICAL FIELD

The present invention relates to a vehicle-mounted apparatus, a processing method, and a program.

BACKGROUND ART

Techniques related to the present invention are disclosed in Patent Documents 1 to 3.

Patent Document 1 discloses a technique of acquiring velocity of a peripheral vehicle, dangerous vehicle information (a danger level of a peripheral vehicle), a moving direction of another vehicle (straight-ahead, right-turn, left-turn), acceleration/deceleration information, information on a blind spot, evaluation information, and the like from a peripheral vehicle by inter-vehicle communication.

Patent Document 2 discloses the following technique. When a mobile body pops out on a road in an attempt to avoid an obstacle such as a vehicle parked or stopped on a road shoulder, when a mobile body pops out a road on a vehicle side by forcibly crossing the road from a shadow of an oncoming vehicle, or the like, a mobile terminal held by the mobile body detects the pop-out and notifies the surroundings of the pop-out through communication. Then, when pop-out information of the mobile body is acquired by the communication, a driving assistance apparatus mounted on a vehicle determines a risk of collision between the mobile body and the vehicle, based on the acquired information, and when it is determined that there is a risk of collision, the driving assistance apparatus performs alert to a driver driving the vehicle, control of the vehicle, or notification to a rear vehicle.

Patent Document 3 discloses a technique of detecting a line-of-sight direction of a driver and issuing a warning when the line-of-sight direction is not directed toward a predetermined object.

Related Document

Patent Document

Patent Document 1: International Patent Publication No. WO2017/047176
Patent Document 2: Japanese Patent Application Publication No. 2014-002647
Patent Document 3: Japanese Patent Application Publication No. 2016-130959

DISCLOSURE OF THE INVENTION

Technical Problem

In recent years, vehicles have become highly functional, and vehicles having various driving assistance functions as disclosed in Patent Documents 1 to 3, for example, have been developed. The driving assistance function is expected to have an effect of preventing an accident and the like. Further, by enhancing the driving assistance function more, effects such as accident prevention are more expected. An object of the present invention is to achieve a driving assistance function different from conventional one.

Solution to Problem

According to the present invention, there is provided a vehicle-mounted apparatus including:
a surrounding object information acquisition unit that acquires surrounding object information relating to a surrounding object being an object detected in surroundings of a vehicle;
a line-of-sight information acquisition unit that acquires line-of-sight information of a driver of the vehicle;
an operation information acquisition unit that acquires operation information indicating an operation performed by the driver on the vehicle;
an operation intention information generation unit that generates operation intention information associating an operation indicated by the operation information with the surrounding object causing the operation indicated by the operation information, based on the surrounding object information, the line-of-sight information, and the operation information; and
a transmission and reception unit that transmits the operation intention information to a surrounding vehicle.

Further, according to the present invention, there is provided a processing method of a vehicle-mounted apparatus, the processing method including,
by a computer:
acquiring surrounding object information relating to a surrounding object being an object detected in surroundings of a vehicle;
acquiring line-of-sight information of a driver of the vehicle;
acquiring operation information indicating an operation performed by the driver on the vehicle;
generating operation intention information associating an operation indicated by the operation information with the surrounding object causing the operation indicated by the operation information, based on the surrounding object information, the line-of-sight information, and the operation information; and
transmitting the operation intention information to a surrounding vehicle.

Further, according to the present invention, there is provided a program that causes a computer to function as:
a surrounding object information acquisition unit that acquires surrounding object information relating to a surrounding object being an object detected in surroundings of a vehicle;
a line-of-sight information acquisition unit that acquires line-of-sight information of a driver of the vehicle;
an operation information acquisition unit that acquires operation information indicating an operation performed by the driver on the vehicle;
an operation intention information generation unit that generates operation intention information associating an operation indicated by the operation information with the surrounding object causing the operation indicated by the operation information, based on the surrounding object information, the line-of-sight information, and the operation information; and
a transmission and reception unit that transmits the operation intention information to a surrounding vehicle.

Advantageous Effects of Invention

According to the present invention, a driving assistance function different from conventional one is achieved.

BRIEF DESCRIPTION OF THE DRAWINGS

FIG. 3 is a diagram schematically illustrating an example of information processed by the vehicle-mounted apparatus according to the present example embodiment.

FIG. 4 is a diagram schematically illustrating an example of information processed by the vehicle-mounted apparatus according to the present example embodiment.

FIG. 5 is a diagram schematically illustrating an example of information processed by the vehicle-mounted apparatus according to the present example embodiment.

DESCRIPTION OF EMBODIMENTS

Figure 1:
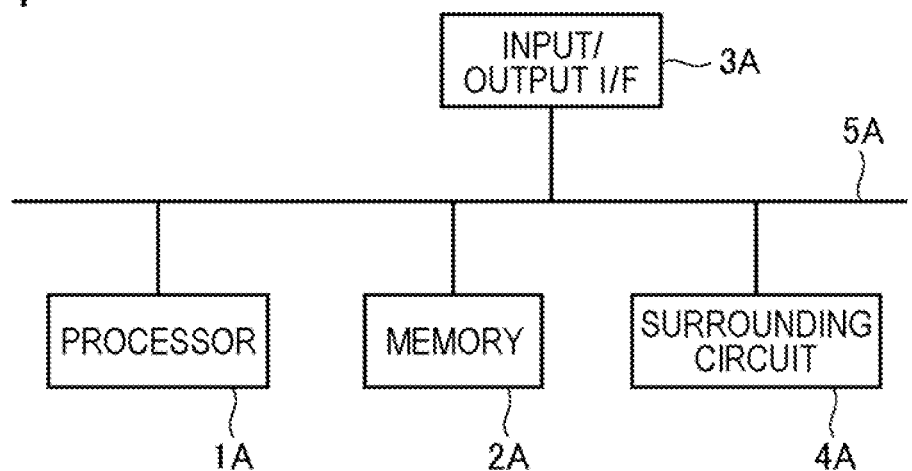
FIG. 1 is a diagram illustrating an example of a hardware configuration of a vehicle-mounted apparatus according to the present example embodiment.

Hereinafter, example embodiments of the present invention will be explained by using the drawings. In all the drawings, the same components are denoted by the same reference numerals, and explanation thereof will be omitted as appropriate.

First Example Embodiment

Overview

A vehicle-mounted apparatus according to the present example embodiment achieves a driving assistance function different from conventional one by transmitting and receiving characteristic information, which has not been conventionally transmitted and received between vehicles, to and from another vehicle-mounted apparatus. The above-described characteristic information is referred to as "operation intention information" in the present example embodiment. The operation intention information includes information associating an operation performed by a driver of the vehicle with a surrounding object causing the operation. Details will be described later.

"Configuration"

Next, a configuration of the vehicle-mounted apparatus will be explained. First, an example of a hardware configuration of the vehicle-mounted apparatus will be explained. Functional units of the vehicle-mounted apparatus are achieved by a Central Processing Unit (CPU) of any computer, a memory, a program loaded into a memory, a storage unit such as a hard disk storing the program (in addition to a program stored from a stage of shipping the apparatus in advance, a program downloaded from a storage medium such as a Compact Disc (CD) or a server or the like on the Internet can be also stored), and an optional combination of hardware and software centering on a network-connection interface. Those skilled in the art appreciates that there are various modified examples to the achievement method and apparatus.

FIG. 1 is a block diagram illustrating a hardware configuration of the vehicle-mounted apparatus. As illustrated in FIG. 1, the vehicle-mounted apparatus includes a processor 1A, a memory 2A, an input/output interface 3A, a surrounding circuit 4A, and a bus 5A. The surrounding circuit 4A includes various modules. The vehicle-mounted apparatus may not include the surrounding circuit 4A. Note that the vehicle-mounted apparatus may be constituted by a plurality of apparatuses that are physically and/or logically separated, or may be constituted by one apparatus that is physically and/or logically integrated. When the vehicle-mounted apparatus is constituted by a plurality of apparatuses that are physically and/or logically separated, each of the plurality of apparatuses may include the above-described hardware configuration.

The bus 5A is a data transmission path through which the processor 1A, the memory 2A, the surrounding circuit 4A, and the input/output interface 3A transmit and receive data to and from each other. The processor 1A is, for example, an arithmetic processing unit such as a CPU or a Graphics Processing Unit (GPU). The memory 2A is, for example, a memory such as a Random Access Memory (RAM) or a Read Only Memory (ROM). The input/output interface 3A includes an interface for acquiring information from an input apparatus, an external apparatus, an external server, an external sensor, a camera, and the like, and an interface for outputting information to an output apparatus, an external apparatus, an external server, and the like. Examples of the input apparatus include a keyboard, a mouse, a microphone, a physical button, a touch panel, and the like. Examples of the output apparatus is, for example, a display, a speaker, a printer, a mailer, and the like. The processor 1A can issue a command to each module and perform an operation, based on the operation results.

Figure 2:
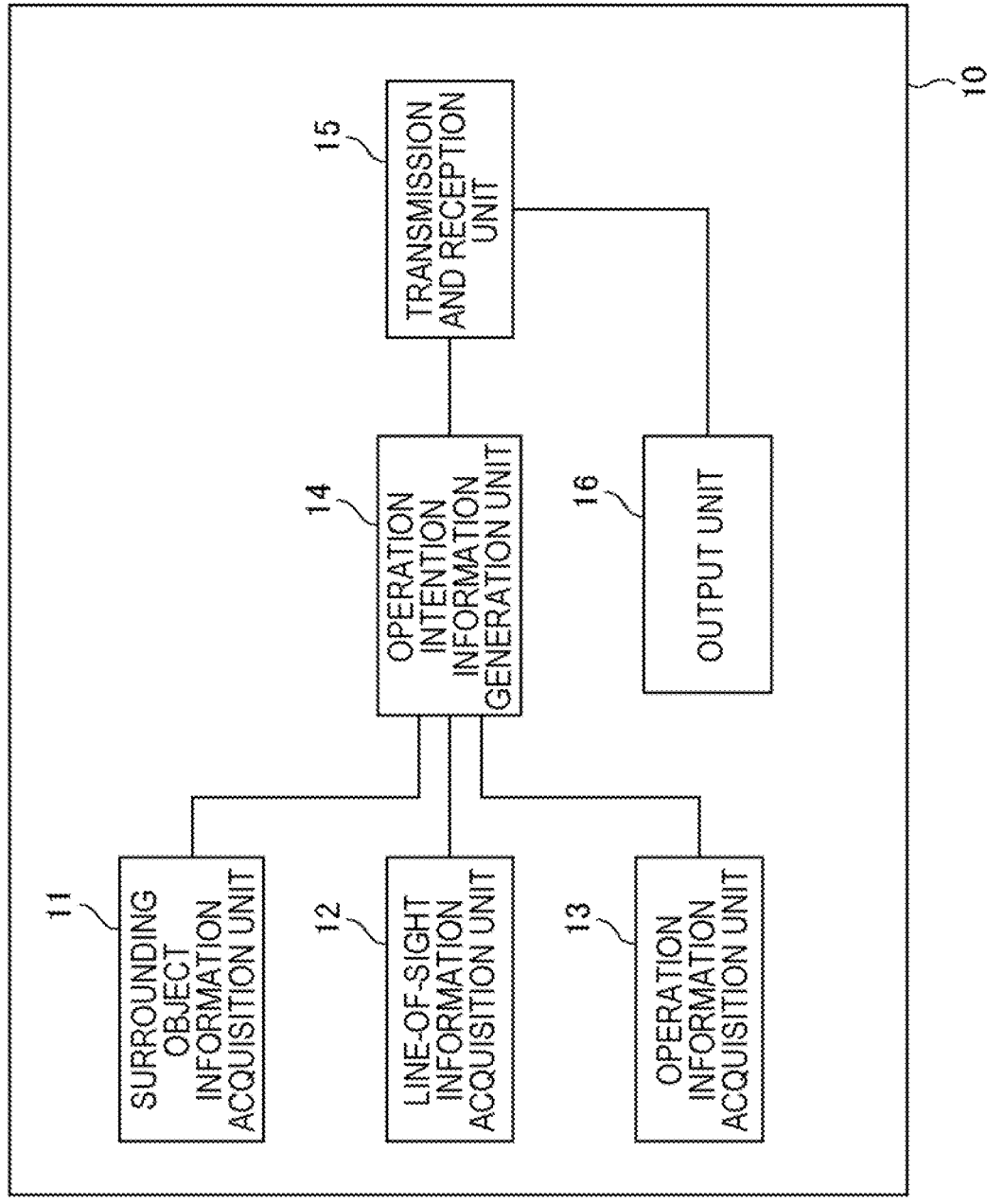
FIG. 2 is a diagram illustrating an example of a functional block diagram of the vehicle-mounted apparatus according to the present example embodiment.

Next, a functional configuration of the vehicle-mounted apparatus will be explained. FIG. 2 illustrates an example of a functional block diagram of a vehicle-mounted apparatus 10. As illustrated, the vehicle-mounted apparatus 10 includes a surrounding object information acquisition unit 11, a line-of-sight information acquisition unit 12, an operation information acquisition unit 13, an operation intention information generation unit 14, a transmission and reception unit 15, and an output unit 16.

The surrounding object information acquisition unit 11 acquires surrounding object information relating to a surrounding object being an object detected in surroundings of the vehicle. The surrounding object information indicates a type (a person, a bicycle, a vehicle, a sign, a traffic light, a crosswalk, a steep curve, a tunnel, etc.) of an object detected in the surroundings of the vehicle, a position (a relative positional relationship with one's own vehicle, etc.), and the like.

The surrounding object information is generated based on data generated by a sensor installed in the vehicle. The sensor is a radar, a LIDAR, a camera, or the like. A technique of generating the surrounding object information as described above, based on the data generated by the sensor is widely known, and therefore, explanation thereof will be omitted.

FIG. 3 schematically illustrates an example of the surrounding object information acquired by the surrounding object information acquisition unit 11. In the illustrated example, a detection date and time (in the figure, "date and time"), a type of a detected object (in the figure, an "object type 1", an "object type 2"), and a position of the detected object (in the figure, "position information") are associated with each other. As in the illustrated example, a plurality of objects may be detected at the same timing.

Returning to FIG. 2, the line-of-sight information acquisition unit 12 acquires line-of-sight information of a driver of the vehicle. The line-of-sight information indicates a line-of-sight direction of the driver. The line-of-sight direction can be represented by, for example, a vector, but is not limited thereto. The line-of-sight information is generated, for example, by analyzing an image generated by a camera that captures an eye of a driver. Since a technique of generating the line-of-sight information as described above is widely known, the explanation thereof will be omitted.

FIG. 4 schematically illustrates an example of the line-of-sight information acquired by the line-of-sight information acquisition unit 12. In the illustrated example, the detection date and time (in the figure, "date and time") and the detected line-of-sight direction (in the figure, "line-of-sight vector") are associated with each other.

Returning to FIG. 2, the operation information acquisition unit 13 acquires operation information indicating an operation performed by the driver on the vehicle. The operation information indicates presence or absence of an operation on an operation target provided in the vehicle and a content thereof. Examples of the operation target include an accelerator, a brake, a handle, a winker, a wiper, an air conditioner, a power window, and the like, but may not include some of these or may include another target. The operation information is generated by a sensor, an electronic control unit (ECU), or the like provided in the vehicle.

A content of the operation indicated by the operation information may indicate the operated operation target or the content thereof, or may indicate a behavior of the vehicle achieved by the operation on the operation target. Examples of the behavior of the vehicle achieved by the operation on the operation target include, but are not limited to, starting, stopping, accelerating, decelerating, turning left, turning right, reducing speed, changing a lane, changing a shift, turning on a light, turning off a light, starting a wiper, stopping a wiper, opening a window, closing a window, and the like.

FIG. 5 schematically illustrates an example of the operation information acquired by the operation information acquisition unit 13. In the illustrated example, the detection date and time (in the figure, "date and time") and the content of the detected operation (in the figure, "operation") are associated with each other.

Returning to FIG. 2, the operation intention information generation unit 14 generates operation intention information in which an operation indicated by the operation information and a surrounding object causing the operation indicated by the operation information are associated with each other, based on the surrounding object information, the line-of-sight information, and the operation information. Hereinafter, processing of generating the operation intention information will be explained.

First Example

For example, the operation intention information generation unit 14 determines a surrounding object that is ahead of a driver's line of sight at a timing at which the operation indicated by the operation information is performed or at a predetermined timing immediately before the timing (a predetermined time before the timing at which the operation indicated by the operation information is performed), based on the surrounding object information and the line-of-sight information. Then, the operation intention information generation unit 14 determines the determined surrounding object as a cause of the operation indicated by the operation information.

Note that the processing of determining a surrounding object located ahead of the driver's line of sight, based on the surrounding object information and the line-of-sight information can be achieved by using any known technique. For example, the above-described processing can be achieved by using a well-known technique such as coordinate conversion and representing coordinates of a surrounding object indicated by the surrounding object information, a line-of-sight vector indicated by the line-of-sight information, and coordinates of a position of the head or eyes of the driver as information of the same coordinate system. The coordinates of the position of the head or eyes of the driver can be determined, for example, by analyzing an image generated by a camera that captures an image of the driver.

Second Example

For example, the cause of the operation indicated by the operation information may be determined based on an estimation model generated by machine learning. An explanatory variable of the machine learning is generated based on the surrounding object information, the line-of-sight information, and the operation information generated at the timing when each operation is performed and/or before the timing. For example, a type, a position, and a distance from the vehicle of the detected surrounding object indicated by the surrounding object information may be used as the explanatory variable. In addition, information (a type of the surrounding object, a position thereof, and a distance thereof from the vehicle) of a surrounding object located ahead of the driver's line of sight, which is determined based on the line-of-sight information and the surrounding object information, and a time that the driver has focused on the surrounding object (a time of having continued to remain on the line of sight) may be used as the explanatory variable. Further, the content of the operation indicated by the operation information may be used as the explanatory variable. In addition, information related to another vehicle generated by a sensor, an ECU, or the like provided in the vehicle, for example, a vehicle speed, a steering angle of a steering wheel, an operation state of a brake, and the like may be used as the explanatory variables. An object variable of the machine learning is information indicating a surrounding object causing each operation. Granting of a correct answer label is performed by an operator.

The transmission and reception unit 15 transmits the operation intention information generated by the operation intention information generation unit 14 to the vehicle-mounted apparatus 10 mounted on a surrounding vehicle. In addition, the transmission and reception unit 15 can receive the operation intention information generated by the vehicle-mounted apparatus 10 mounted on another vehicle (the surrounding vehicle) from the vehicle-mounted apparatus 10 mounted on the another vehicle. For example, the transmission and reception of the operation intention information between vehicles is achieved by using inter-vehicle communication or road-to-vehicle communication. The transmission and reception may be achieved by another means.

In addition to the operation intention information, the transmission and reception unit 15 may transmit and receive the surrounding object information acquired by the surrounding object information acquisition unit 11 to/from the vehicle-mounted apparatus 10 mounted on the surrounding vehicle. In this case, the transmission and reception unit 15 may selectively transmit and receive some of the surrounding object information acquired by the surrounding object information acquisition unit 11, instead of transmitting and receiving all of the surrounding object information, to and from the vehicle-mounted apparatus 10 mounted on the surrounding vehicle. For example, in addition to the operation intention information, the transmission and reception unit 15 may transmit and receive surrounding object information relating to a surrounding object indicated by the operation intention information, i.e., a surrounding object causing an operation indicated by the operation intention information, to and from the vehicle-mounted apparatus 10 mounted on the surrounding vehicle. The surrounding object information relating to the surrounding object that is not the cause of the operation indicated by the operation intention information may not be transmitted and received to and from the vehicle-mounted apparatus 10 mounted on the surrounding vehicle. The surrounding object information to be transmitted and received by the transmission and reception unit 15 may include at least one of information indicating a type of the surrounding object and position information indicating a position of the surrounding object.

In addition, the transmission and reception unit 15 may transmit only operation intention information of high importance among the operation intention information generated by the operation intention information generation unit 14 to the vehicle-mounted apparatus 10 mounted on the surrounding vehicle. Namely, the transmission and reception unit 15 may include a means for determining whether the operation intention information generated by the operation intention information generation unit 14 is of high importance, and a means for transmitting only the operation intention information of high importance to the vehicle-mounted apparatus 10 mounted on the surrounding vehicle. The operation intention information of high importance is, for example, "one in which the surrounding object causing the operation indicated by the operation intention information satisfies a predetermined condition (e.g., "person", etc.)", "one in which the content of the operation indicated by the operation intention information satisfies a predetermined condition (e.g., "brake operation", etc.)", or "one in which the surrounding object causing the operation indicated by the operation intention information satisfies a predetermined condition (e.g., "person", etc.), and the content of the operation indicated by the operation intention information satisfies a predetermined condition (e.g., "brake operation", etc.)".

The output unit 16 outputs the operation intention information received from the vehicle-mounted apparatus 10 mounted on another vehicle toward the driver. The output unit 16 may further output the surrounding object information received from the vehicle-mounted apparatus 10 mounted on another vehicle toward the driver.

Note that the output unit 16 may not output all the received operation intention information toward the driver, but may output only the operation intention information received from the vehicle-mounted apparatus 10 mounted on some of vehicles toward the driver. Some of the vehicles are vehicles in which a relative positional relationship with a host vehicle satisfies a predetermined condition, and are, for example, preceding vehicles and the like traveling in front of the host vehicle. A means for discriminating, from among the received information, the information received from the vehicle-mounted apparatus 10 mounted on some of the vehicles can be achieved by using any widely known technique. For example, position information (global positioning system (GPS) information, etc.) of respective vehicles may be included in the information transmitted and received between the vehicles, and the positional relationship between the vehicles may be determined by using the position information.

The output unit 16 may output information in which "operation" indicated by the operation intention information and "surrounding object" causing the operation are associated with each other, such as "(operation) brake operation: (cause) person". Further, the output unit 16 may generate and output a sentence by using a template registered in advance, based on the received operation intention information, such as "a preceding vehicle has performed a brake operation because a person exists", for example. Further, the output unit 16 may further use the surrounding object information and output more detailed information such as "a preceding vehicle has performed a brake operation because a person exists in a right front side", for example.

In addition, the output unit 16 may output only the operation intention information of high importance toward the driver among the received operation intention information. Namely, the output unit 16 may include a means for determining whether the received operation intention information is of high importance, and a means for outputting only the operation intention information of high importance toward the driver. The operation intention information of high importance is, for example, "one in which the surrounding object causing the operation indicated by the operation intention information satisfies a predetermined condition (e.g., "person", etc.)", "one in which the content of the operation indicated by the operation intention information satisfies a predetermined condition (e.g., "brake operation", etc.)", or "one in which the surrounding object causing the operation indicated by the operation intention information satisfies a predetermined condition (e.g., "person", etc.), and the content of the operation indicated by the operation intention information satisfies a predetermined condition (e.g., "brake operation", etc.)".

The output unit 16 can achieve output of the information as described above through any output apparatus such as a display, a head-up display, a speaker, a projection apparatus, and a wearable device. For example, the output unit 16 may output the information as described above by using a voice announcement function mounted on a car navigation system installed in a vehicle, a wearable device worn by a driver, or the like. Further, the output unit 16 may display the information as described above on a head-up display, an instrument panel, or the like. Further, the output unit 16 may combine the above-described voice guidance and the above-described display.

Figure 6:
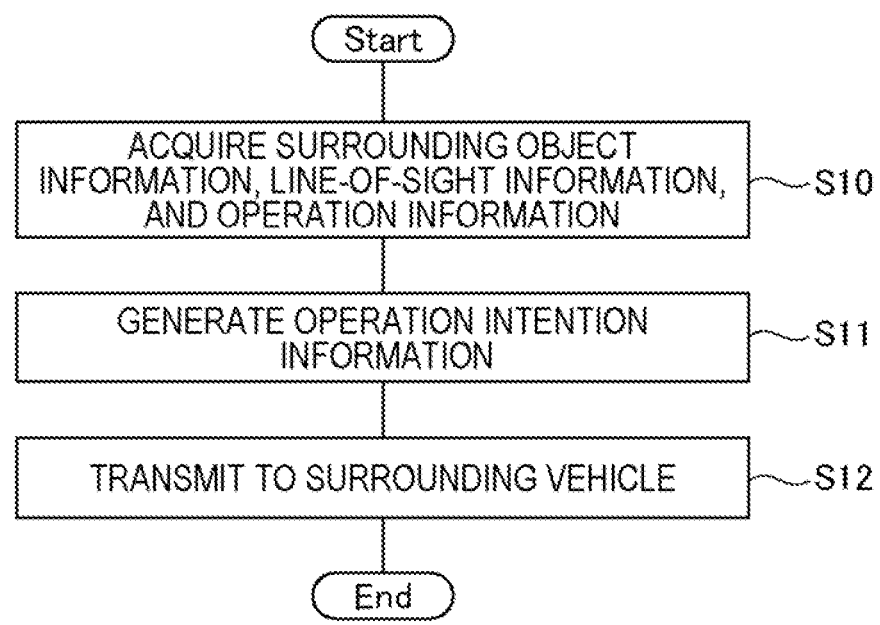
FIG. 6 is a flowchart illustrating an example of a flow of processing performed by the vehicle-mounted apparatus according to the present example embodiment.

Next, an example of a flow of processing in which the vehicle-mounted apparatus 10 transmits the operation intention information to the surrounding vehicle will be explained by using a flowchart of FIG. 6.

In S10, the vehicle-mounted apparatus 10 acquires surrounding object information relating to a surrounding object that is an object detected in the surroundings of a vehicle, line-of-sight information of a driver of the vehicle, and operation information indicating an operation performed by the driver on the vehicle.

In S11, the vehicle-mounted apparatus 10 generates operation intention information in which an operation indicated by the operation information and the surrounding object causing the operation indicated by the operation information are associated with each other, based on the surrounding object information, the line-of-sight information, and the operation information which are acquired in S10.

In S12, the vehicle-mounted apparatus 10 transmits the operation intention information generated in S11 to the vehicle-mounted apparatus 10 mounted on the surrounding vehicle.

Figure 7:
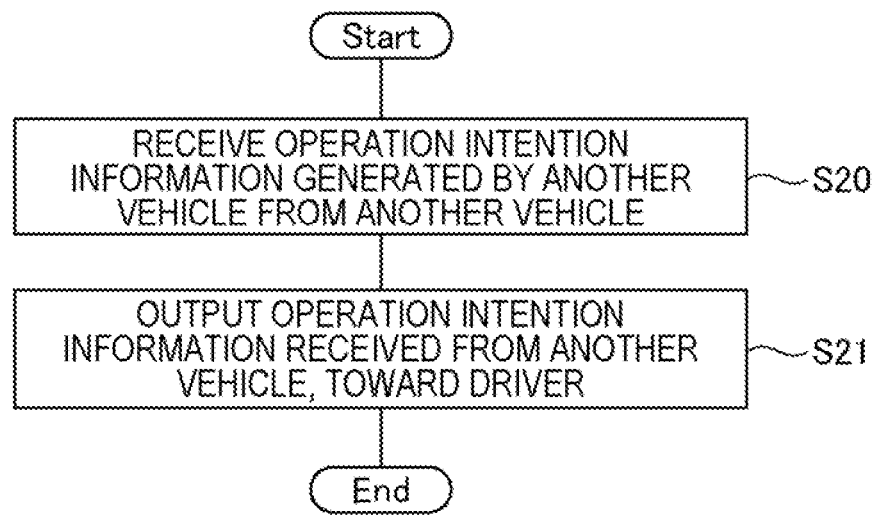
FIG. 7 is a flowchart illustrating an example of a flow of processing performed by the vehicle-mounted apparatus according to the present example embodiment.

Next, an example of a flow of processing in which the vehicle-mounted apparatus 10 receives the operation intention information from the surrounding vehicle and outputs the operation intention information toward the driver will be explained by using the flowchart of FIG. 7.

In S20, the vehicle-mounted apparatus 10 receives the operation intention information generated by a vehicle-mounted apparatus 10 mounted on another vehicle (surrounding vehicle) from the vehicle-mounted apparatus 10 mounted on the another vehicle.

In S21, the vehicle-mounted apparatus 10 outputs the operation intention information received in S20 toward the driver.

Advantageous Effect

The vehicle-mounted apparatus 10 according to the present example embodiment transmits and receives characteristic information (operation intention information) that has not been transmitted and received between vehicles to and from another vehicle-mounted apparatus. According to such a vehicle-mounted apparatus 10, a driving assistance function different from the conventional one is provided, and an available driving assistance function is further enhanced.

By the way, the driver can check a behavior (deceleration, stop, lane change, etc.) of the surrounding vehicle by visually checking the surroundings. Then, the driver can recognize an operation performed by a driver of the surrounding vehicle, based on the checked behavior of the surrounding vehicle. However, conventionally, the driver could not recognize a cause of the operation by the driver of the surrounding vehicle, i.e., "why such an operation has been performed". Therefore, even when the operation by the driver of the surrounding vehicle is recognized, it is difficult to appropriately determine whether the driver himself/herself needs to follow the surrounding vehicle and perform the operation, whether any special operation is necessary, and the like.

In response to this problem, according to the vehicle-mounted apparatus 10 that presents the operation intention information received from the surrounding vehicle (e.g., a preceding vehicle), i.e., information associating the operation performed by the driver of the surrounding vehicle with the surrounding object causing the operation, to the driver, the driver can recognize an intention of the operation by the driver of the surrounding vehicle, i.e., "why such an operation has been performed", based on the operation intention information. Therefore, it is possible to appropriately and quickly determine the operation content to be performed by the driver.

In addition, although the vehicle-mounted apparatus 10 can transmit and receive the surrounding object information relating to the surrounding object detected in the surroundings of the vehicle, to and from a vehicle-mounted apparatus 10 mounted on another vehicle, it is possible to transmit and receive only the surrounding object information relating to the surrounding object causing the operation indicated by the operation intention information, for example, instead of transmitting and receiving the surrounding object information relating to all the surrounding objects. When there is too much information to be transmitted and received between vehicles, communication congestion or the like may occur. In addition, a burden of data processing by the vehicle-mounted apparatus 10 also increases. Further, when there is too much information to be presented to the driver, a burden on the driver increases, and inconvenience such as overlooking of important information may occur. According to the vehicle-mounted apparatus 10 capable of transmitting and receiving only appropriate information narrowed down by the criteria as described above between vehicles, it is possible to reduce the above-described inconvenience while achieving a new driving assistance function.

Second Example Embodiment

The vehicle-mounted apparatus 10 according to the present example embodiment transmits and receives, to and from a vehicle-mounted apparatus 10 mounted on a surrounding vehicle, operation intention information further including "a purpose of an operation indicated by operation information (e.g., collision avoidance)", in addition to "information associating the operation indicated by the operation information (e.g., a handle operation) with a surrounding object (e.g., a person) causing the operation indicated by the operation information". Hereinafter, the present invention will be explained in detail.

The operation intention information generation unit 14 generates operation intention information indicating "a purpose of the operation indicated by the operation information", in addition to "information associating the operation indicated by the operation information with the surrounding object causing the operation indicated by the operation information", based on surrounding object information, line-of-sight information, and the operation information. Generation of "Information associating the operation indicated by the operation information with a surrounding object causing the operation indicated by the operation information" is achieved by the same means as in the first example embodiment. Hereinafter, processing of determining "the purpose of the operation indicated by the operation information" will be explained.

For example, the purpose of the operation indicated by the operation information may be determined based on an estimation model generated by machine learning. An explanatory variable of the machine learning is generated based on the surrounding object information, the line-of-sight information, and the operation information generated at a timing when each operation is performed and/or before the timing. The explanatory variable of the machine learning includes "information associating an operation indicated by the operation information with a surrounding object causing the operation indicated by the operation information". An object variable of the machine learning is "a purpose of the operation indicated by the operation information". Examples of the explanatory variables and object variables are given below.

TABLE 1

| EXPLANATORY VARIABLE | | |
|---|---|---|
| OPERATION | CAUSE | OBJECT VARIABLE |
| STOP | PERSON IN FRONT | COLLISION PREVENTION |
| STOP | VEHICLE IN FRONT | COLLISION PREVENTION |
| CLOSE WINDOW | TRUCK IN FRONT | PREVENTION OF EXHAUST GAS FROM ENTERING VEHICLE |
| TURN ON LIGHT, STOP WIPER, AND CLOSE WINDOW | TUNNEL | RESPONSE TO DRIVING IN TUNNEL |
| LANE CHANGE | JUNCTION POINT | AVOIDANCE OF CONTACT WITH MERGING VEHICLE |
| DECELERATION | SIGN OF STEEP CURVE AND WHITE LINE | ACCIDENT PREVENTION AT CURVE |
| . | . | . |
| . | . | . |
| . | . | . |

The explanatory variable may include other information. For example, a type of another detected surrounding object indicated by the surrounding object information, a position thereof, and a distance thereof from the vehicle may be used as the explanatory variable. In addition, information of a surrounding object (a type of the surrounding object, a position thereof, and a distance thereof from the vehicle) located ahead of the driver's line of sight, which is determined based on the line-of-sight information and the surrounding object information, and a time that the driver has focused on the surrounding object (a time of having continued to remain on the line of sight) may be used as the explanatory variable. Further, the content of the operation indicated by the operation information may be used as the explanatory variable. In addition, information related to another vehicle generated by a sensor, an ECU, or the like provided in the vehicle, for example, a vehicle speed, a steering angle of a steering wheel, an operation state of a brake, and the like may be used as the explanatory variables. Granting of a correct answer label is performed by an operator.

Other configurations of the vehicle-mounted apparatus 10 according to the present example embodiment are the same as those of the first example embodiment.

By the vehicle-mounted apparatus 10 according to the present example embodiment, the same advantageous effect as those of the first example embodiment can be achieved. Further, by the vehicle-mounted apparatus 10 according to the present example embodiment, the operation intention information including the purpose of the operation can be transmitted and received to and from the vehicle-mounted apparatus 10 mounted on the surrounding vehicle. According to such a vehicle-mounted apparatus 10, the driver can more specifically recognize an intention of operation by a driver of the surrounding vehicle, i.e., "why such an operation has been performed". Therefore, it is possible to appropriately and quickly determine an operation content to be performed by the driver.

Third Example Embodiment

A vehicle-mounted apparatus 10 according to the present example embodiment predicts an operation to be performed in the future and a cause of the operation (a surrounding object), based on surrounding object information, line-of-sight information, and operation information. Then, the vehicle-mounted apparatus 10 transmits and receives future operation intention information associating an operation predicted to be performed in the future with a cause of the operation (a surrounding object) to and from the vehicle-mounted apparatus 10 mounted on the surrounding vehicle. Hereinafter, the present invention will be explained in detail.

The operation intention information generation unit 14 predicts an operation to be performed in the future (an operation to be performed several seconds later) and a cause of the operation (a surrounding object), based on the surrounding object information, the line-of-sight information, and the operation information. Then, the operation intention information generation unit 14 generates future operation intention information in which an operation predicted to be performed in the future and a cause of the operation (a surrounding object) are associated with each other. Hereinafter, an explanation will be given of processing of predicting an operation to be performed in the future and a cause of the operation (a surrounding object).

First Example

For example, a prediction of an operation to be performed in the future and a cause of the operation (a surrounding object) is achieved based on an estimation model generated by machine learning. An explanatory variable of the machine learning is generated based on surrounding object information generated, line-of-sight information, and operation information, which are generated at a timing to be predicted and/or before the timing. For example, a type, a position, and a distance from the vehicle, of a detected surrounding object indicated by the surrounding object information may be used as the explanatory variable. In addition, information of a surrounding object (a type of a surrounding object, a position thereof, and a distance thereof from the vehicle) located ahead of a driver's line of sight, which is determined based on the line-of-sight information and the surrounding object information, and a time that the driver has focused on the surrounding object (a time of having continued to remain on the line of sight) may be used as the explanatory variable. Further, a content of the operation indicated by the operation information may be used as the explanatory variable. In addition, information related to another vehicle generated by a sensor, an ECU, or the like provided in the vehicle, for example, a vehicle speed, a steering angle of a steering wheel, an operation state of a brake, and the like may be used as explanatory variables. An object variable of the machine learning is an operation performed immediately after the timing to be predicted (a few seconds later) and a cause of the operation (a surrounding object). Granting of a correct answer label is performed by an operator.

Second Example

A second example differs from the first example in contents of explanatory variables of machine learning. In the second example, in addition to the explanatory variables explained in the first example, information (operation intention information and surrounding object information) received from a preceding vehicle is used as the explanatory variable. Other configurations are the same as those of the first example.

Note that the operation intention information generation unit 14 may generate operation intention information further including "a purpose of the operation predicted to be performed in the future", in addition to "the information associating the operation predicted to be performed in the future with the cause of the operation (surrounding object)" described above. The determination of "the purpose of the operation predicted to be performed in the future" can be achieved by the same processing as the processing for determining "the purpose of the operation indicated by the operation information" explained in the second example embodiment.

The transmission and reception unit 15 transmits and receives the future operation intention information to and from the vehicle-mounted apparatus 10 mounted on the surrounding vehicle.

The output unit 16 outputs the received future operation intention information toward the driver. The output unit 16 can output the future operation intention information toward the driver in the same manner as the output of the operation intention information explained in the first example embodiment.

Other configurations of the vehicle-mounted apparatus 10 according to the present example embodiment are the same as those of the first and second example embodiments.

By the vehicle-mounted apparatus 10 according to the present example embodiment, the same advantageous effects as those of the first and second example embodiments can be achieved. Further, by the vehicle-mounted apparatus 10 according to the present example embodiment, it is possible to transmit and receive operation intention information including prediction results of a future operation and a cause thereof, a purpose of the future operation, and the like to and from the vehicle-mounted apparatus 10 mounted on the surrounding vehicle. The vehicle-mounted apparatus 10 allows the driver to recognize the operation and intention of the driver of the surrounding vehicle at an earlier timing. Therefore, it is possible to appropriately and quickly determine the operation content to be performed by the driver.

Although the example embodiments of the present invention have been described above with reference to the drawings, these are examples of the present invention, and various configurations other than the above may be adopted.

In this specification, "acquisition" includes at least one of: "acquiring, by a host apparatus, data stored in another apparatus or a storage medium (active acquisition)" based on a user input or based on an instruction of a program, for example, making a request or an inquiry to another apparatus and receiving data, accessing to another apparatus or a storage medium and reading out data, or the like; "inputting data being output from another apparatus to a host apparatus (passive acquisition)" based on a user input or based on an instruction of a program, for example, receiving data to be distributed (or transmitted, sent push notification, etc.) or selecting data from the received data or information and acquiring the selected data; and "generating new data by editing data (text editing, rearranging the data, extracting some of the data, changing a file format, etc.) and the like, and acquiring the new data".

Some or all of the above-described example embodiments may be described as the following supplementary notes, but are not limited thereto.

1. A vehicle-mounted apparatus including:
    a surrounding object information acquisition unit that acquires surrounding object information relating to a surrounding object being an object detected in surroundings of a vehicle;
    a line-of-sight information acquisition unit that acquires line-of-sight information of a driver of the vehicle;
    an operation information acquisition unit that acquires operation information indicating an operation performed by the driver on the vehicle;
    an operation intention information generation unit that generates operation intention information associating an operation indicated by the operation information with the surrounding object causing the operation indicated by the operation information, based on the surrounding object information, the line-of-sight information, and the operation information; and
    a transmission and reception unit that transmits the operation intention information to a surrounding vehicle.
2. The vehicle-mounted apparatus according to 1, wherein the operation intention information generation unit generates the operation intention information further including a purpose of an operation indicated by the operation information.
3. The vehicle-mounted apparatus according to 1 or 2, wherein the transmission and reception unit transmits the surrounding object information relating to the surrounding object indicated by the operation intention information to the surrounding vehicle.
4. The vehicle-mounted apparatus according to any one of 1 to 3, wherein the transmission and reception unit further transmits position information indicating a position of the surrounding object indicated by the operation intention information to the surrounding vehicle.
5. The vehicle-mounted apparatus according to any one of 1 to 4, wherein the transmission and reception unit determines whether the operation intention information generated by the operation intention information generation unit has a high importance, and transmits the operation intention information having a high importance to the surrounding vehicle.
6. The vehicle-mounted apparatus according to any one of 1 to 5, wherein
    the transmission and reception unit receives the operation intention information generated by another vehicle from the another vehicle, and
    the vehicle-mounted apparatus further includes
    an output unit that outputs the operation intention information received from the another vehicle toward the driver.
7. The vehicle-mounted apparatus according to 6, wherein the output unit determines whether the operation intention information received from the another vehicle has a high importance, and outputs the operation intention information having a high importance toward the driver.

8. The vehicle-mounted apparatus according to any one of 1 to 7, wherein
the operation intention information generation unit generates future operation intention information associating an operation predicted to be performed in future with the surrounding object that is a cause of the operation predicted to be performed in future, based on the surrounding object information, the line-of-sight information, and the operation information, and
the transmission and reception unit transmits the future operation intention information to the surrounding vehicle.

9. The vehicle-mounted apparatus according to 8, wherein the operation intention information generation unit generates the future operation intention information further including a purpose of the operation predicted to be performed in future.

10. A processing method of a vehicle-mounted apparatus including,
by a computer:
acquiring surrounding object information relating to a surrounding object being an object detected in surroundings of a vehicle;
acquiring line-of-sight information of a driver of the vehicle;
acquiring operation information indicating an operation performed by the driver on the vehicle;
generating operation intention information associating an operation indicated by the operation information with the surrounding object causing the operation indicated by the operation information, based on the surrounding object information, the line-of-sight information, and the operation information; and transmitting the operation intention information to a surrounding vehicle.

11. A program causing a computer to function as:
a surrounding object information acquisition unit that acquires surrounding object information relating to a surrounding object being an object detected in surroundings of a vehicle;
a line-of-sight information acquisition unit that acquires line-of-sight information of a driver of the vehicle;
an operation information acquisition unit that acquires operation information indicating an operation performed by the driver on the vehicle;
an operation intention information generation unit that generates operation intention information associating an operation indicated by the operation information with the surrounding object causing the operation indicated by the operation information, based on the surrounding object information, the line-of-sight information, and the operation information; and
a transmission and reception unit that transmits the operation intention information to a surrounding vehicle.

REFERENCE SIGNS LIST

10 Vehicle-mounted apparatus
11 Surrounding object information acquisition unit
12 Line-of-sight information acquisition unit
13 Operation information acquisition unit
14 Operation intention information generation unit
15 Transmission and reception unit
16 Output unit
1A Processor
2A Memory
3A Input/output I/F
4A Surrounding circuit
5A Bus

What is claimed is:

1. A vehicle-mounted apparatus comprising:
at least one memory storing one or more instructions; and
at least one processor configured to execute the one or more instructions to:
acquire surrounding object information relating to a surrounding object being an object detected in surroundings of a vehicle;
acquire line-of-sight information of a driver of the vehicle;
acquire operation information indicating an operation performed by the driver on the vehicle;
determine a purpose of the operation indicated by the operation information, the operation being caused by the surrounding object and including closing a window, turning on a light, or stopping a wiper;
generate operation intention information, including the purpose of the operation indicated by the operation information, associating an operation indicated by the operation information with the surrounding object causing the operation indicated by the operation information, based on the surrounding object information, the line-of-sight information, and the operation information; and
transmit the operation intention information to a surrounding vehicle.

2. The vehicle-mounted apparatus according to claim 1, wherein the processor is further configured to execute the one or more instructions to transmit the surrounding object information relating to the surrounding object indicated by the operation intention information to the surrounding vehicle.

3. The vehicle-mounted apparatus according to claim 1, wherein the processor is further configured to execute the one or more instructions to transmit position information indicating a position of the surrounding object indicated by the operation intention information to the surrounding vehicle.

4. The vehicle-mounted apparatus according to claim 1, wherein the processor is further configured to execute the one or more instructions to determine whether the operation intention information has a high importance, and transmit the operation intention information having the high importance to the surrounding vehicle.

5. The vehicle-mounted apparatus according to claim 1, wherein the processor is further configured to execute the one or more instructions to:
receive the operation intention information generated by another vehicle from the another vehicle, and
output the operation intention information received from the another vehicle, toward the driver.

6. The vehicle-mounted apparatus according to claim 5, wherein the processor is further configured to execute the one or more instructions to determine whether the operation intention information received from the another vehicle has a high importance, and output the operation intention information having the high importance toward the driver.

7. The vehicle-mounted apparatus according to claim 1, wherein the processor is further configured to execute the one or more instructions to:
generate future operation intention information associating an operation predicted to be performed in future with the surrounding object being a cause of the operation predicted to be performed in future, based on the surrounding object information, the line-of-sight information, and the operation information, and transmit the future operation intention information to the surrounding vehicle.

8. The vehicle-mounted apparatus according to claim 7, wherein the processor is further configured to execute the one or more instructions to generate the future operation intention information further including a purpose of the operation predicted to be performed in future.

9. A processing method of a vehicle-mounted apparatus, the processing method performed by a computer and comprising:
- acquiring surrounding object information relating to a surrounding object being an object detected in surroundings of a vehicle;
- acquiring line-of-sight information of a driver of the vehicle;
- acquiring operation information indicating an operation performed by the driver on the vehicle;
- determine a purpose of the operation indicated by the operation information, the operation being caused by the surrounding object and including closing a window, turning on a light, or stopping a wiper;
- generating operation intention information, including the purpose of the operation indicated by the operation information, associating an operation indicated by the operation information with the surrounding object causing the operation indicated by the operation information, based on the surrounding object information, the line-of-sight information, and the operation information; and
- transmitting the operation intention information to a surrounding vehicle.

10. A non-transitory storage medium storing a program executable by a computer to:
- acquire surrounding object information relating to a surrounding object being an object detected in surroundings of a vehicle;
- acquire line-of-sight information of a driver of the vehicle;
- acquire operation information indicating an operation performed by the driver on the vehicle;
- determine a purpose of the operation indicated by the operation information, the operation being caused by the surrounding object and including closing a window, turning on a light, or stopping a wiper;
- generate operation intention information, including the purpose of the operation indicated by the operation information, associating an operation indicated by the operation information with the surrounding object causing the operation indicated by the operation information, based on the surrounding object information, the line-of-sight information, and the operation information; and
- transmit the operation intention information to a surrounding vehicle.

* * * * *